(12) United States Patent
Kalbag

(10) Patent No.: US 7,957,304 B2
(45) Date of Patent: Jun. 7, 2011

(54) SYSTEM FOR AND METHOD OF USING A LOOPBACK MECHANISM TO PERFORM NETWORK TESTING

(75) Inventor: Rohit Satish Kalbag, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 162 days.

(21) Appl. No.: 12/487,968

(22) Filed: Jun. 19, 2009

(65) Prior Publication Data

US 2010/0322085 A1 Dec. 23, 2010

(51) Int. Cl.
*H04L 12/26* (2006.01)

(52) U.S. Cl. ........................................ 370/249

(58) Field of Classification Search .................. 370/241, 370/242–253
See application file for complete search history.

(56) References Cited

U.S. PATENT DOCUMENTS

2007/0274227 A1* 11/2007 Rauscher et al. ............. 370/252
2009/0113045 A1* 4/2009 Kozisek ........................ 709/224

* cited by examiner

*Primary Examiner* — Frank Duong

(57) ABSTRACT

A system for and method of actively running performance tests is presented. The system and method allow a device connected, via a VPN or IPSec tunnel, to a VoIP or other service provider network, to run network performance tests using the IP address assigned by a VPN concentrator. The device utilizes the IP address assigned by the VPN concentrator as a means for performing loopback testing. These performance tests characterize the connectivity of the network. Systems and methods then use this characterization to do call admission control, traffic shaping or prioritization.

20 Claims, 4 Drawing Sheets

SYSTEM FOR AND METHOD OF USING A LOOPBACK MECHANISM TO PERFORM NETWORK TESTING

BACKGROUND INFORMATION

Broadband access technologies—such as, by way of non-limiting example, cable modems, digital subscriber lines ("DSL"), FiOS, asynchronous transfer mode ("ATM"), frame relays, and satellite—have facilitated voice, video, and other data communication over the Internet and other private and public networks. Moreover, broadband access technology has allowed service providers to expand content and service offerings to home and business users. As a result, there are many products and services that are available that allow the customer's broadband internet connection to be used to provide voice or other kinds of real-time services (e.g. internet access service, video service, gaming applications, etc.).

Generally, the service provider provides the customer with customer-premises equipment ("CPE") that the customer may then plug into the customer's residential gateway. The CPE may not be able to determine whether it is behind a low-speed link or a high-speed link. Thus, the CPE may not be able to determine how much available throughput it can utilize. Without this information, the CPE may not be able to determine how the available throughput should be allocated amongst multiple services for optimum performance and/or to customize content delivery in accordance with consumer preferences or provider preferences.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

Figure 1:
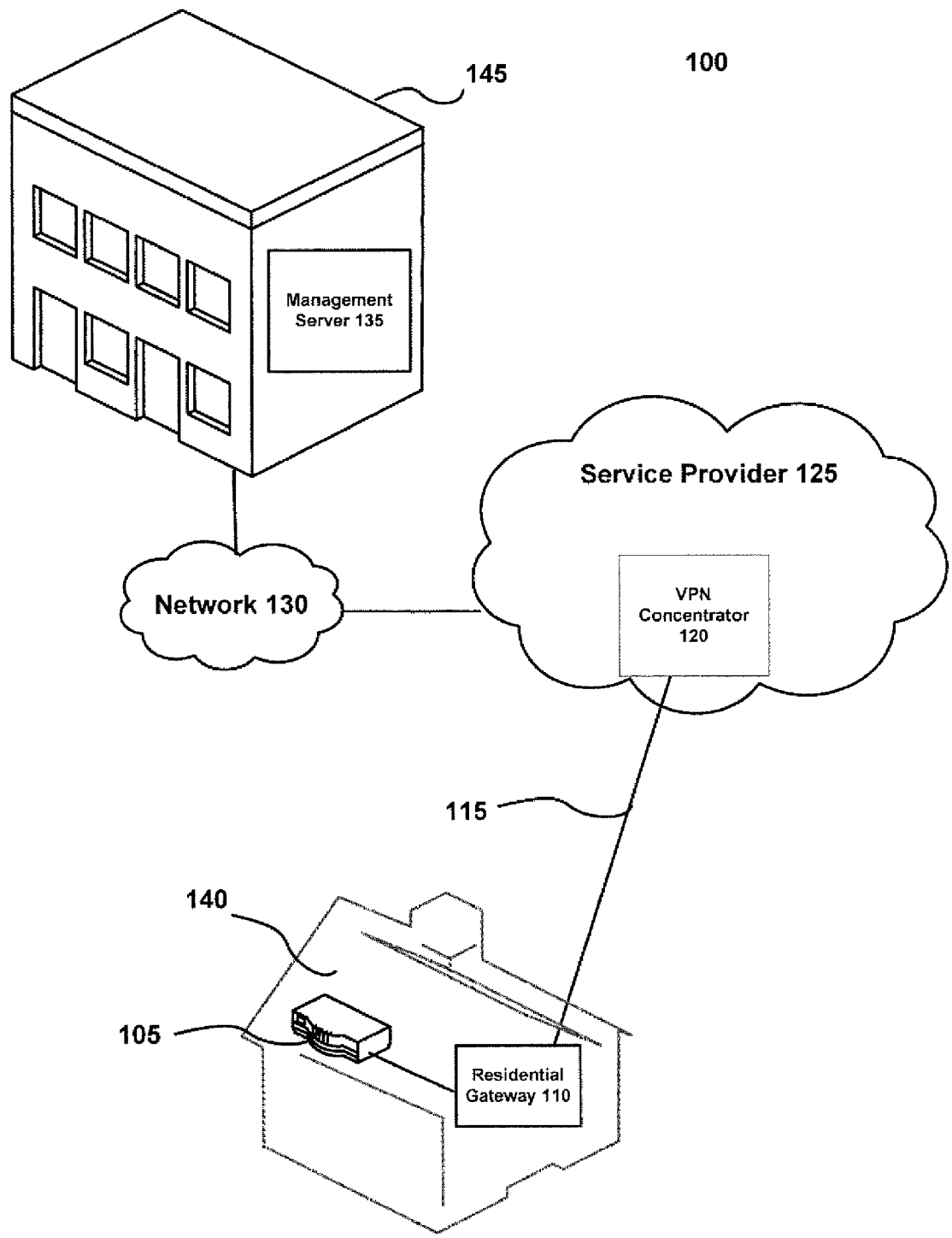
FIG. 1 is a schematic diagram illustrating an exemplary network environment where the systems for and methods of using a loopback mechanism to perform network testing may be performed in accordance with exemplary embodiments.

Broadband access technologies—such as cable modems, digital subscriber lines ("DSL"), FiOS, asynchronous transfer mode ("ATM"), frame relays, and satellite—have facilitated voice, video, and other data communication over the Internet and other private and public networks. Moreover, broadband access technology has allowed service providers to expand content and service offerings to home and business users. Thus, there are many products and services that are available that allow the customer's broadband internet connection to be used to provide voice or other kinds of real-time services (e.g. internet access service, video service, gaming applications, etc.).

Generally the service provider provides the customer with a CPE box that then plugs into the customer's residential gateway. The service provider's CPE box generally provides the essential functionality for the service that the customer has subscribed for. Two non-limiting examples of CPE and their corresponding functionality are: (1) a Voice over Internet Protocol Analog Telephone Adapter ("VoIP ATA"), which enables VoIP phone service, and (2) a FemtoCell, which acts a cellular base station for the home or office. Service traffic from such devices intermingles with the other traffic that may exist on the customer's home or office network. Further, the CPE may not be able to determine what is the available access throughput it can utilize. In other words the customer may have access to the Internet via DSL, Cable, FiOS or satellite—all of which have varying throughput potential—but the CPE may not have a way of determining which of these connection types the customer has or how heavily this connection is being used by devices other than that particular CPE.

Many services also rely on the CPE to create a Virtual Private Network ("VPN") or Internet Protocol Security ("IP-Sec") tunnel to a VPN concentrator hosted at the service provider's network. Establishing a VPN connection secures traffic and provides a secure connection to the service provider's network from the outside world.

Exemplary systems and methods of the present invention allow for the detection and characterization of the customer's broadband connectivity and provide measures for adapting to the type of broadband connection in a manner that increases network performance. To that end, systems and methods may create a loopback route using the Tunnel Inner Address ("TIA") assigned by the VPN concentrator to route outgoing traffic back to the device. In some embodiments, the VPN client in the CPE may implement routines to create the loopback route for the data packets.

Network connectivity performance tests may be carried out on this loopback route. By carrying out performance tests on the loopback route, the device can gain data reflecting the characteristics of its broadband access and prioritize its service traffic accordingly. The performance information can be used to estimate the amount of throughput available for the device to dedicate for its service. This can lead to prioritization of voice traffic which may result in a better overall customer experience. Additionally, the information obtained from the performance test can be used to select VPN concentrators and selectively enable higher bandwidth applications.

This loopback technique uses the data plane and therefore avoids the limited control-plane resources on the VPN concentrator. The loopback route mechanism avoids IPSec security protocols (such as exchanging certificates, IKE protocols, etc.) which are used to set up and maintain an IPSec session. As a result, the performance metric tests are not limited by the lower capacity of the VPN concentrator to handle these control-plane protocols. The loopback mechanism may allow performance metrics to be calculated without embedded external probes at the service provider's network.

In exemplary embodiments, systems, modules, methods and/or computer readable mediums for testing network performance and characteristics using a loopback mechanism are provided.

FIG. 1 is a schematic diagram illustrating an exemplary network environment where the systems for and methods of using a loopback mechanism to perform network testing may be performed in accordance with exemplary embodiments. As shown, CPE 105 may be located at consumer premises 140, which may be a residential or business environment. Consumer premises 140 is not necessarily defined by any physical structures such as a house, apartment complex, or office building. CPE 105 may include equipment that a service provider may supply to a customer to facilitate the customer's access and enjoyment of subscribed-for services. CPE 105 may be a set top box. CPE 105, may be, by way of non-limiting example, a VoIP ATA or a FemtoCell. A Femtocell may be a cellular base station configured to connect to a service provider's network.

CPE 105 may be communicatively coupled with a residential gateway 110. Residential gateway 110 may be located at consumer premises 140, which may be a residential or business environment. Residential gateway 110 may also be located outside the consumer premises 140. Residential gateway 110 could be one of many devices that allow for a connection between a LAN and a WAN. Residential gateway 110 could be, by way of non-limiting example, a DSL modem, a cable modem, a device configured to allow a connection between a LAN and a fiber optic line, or a LAN and a satellite link.

Residential gateway 110 may be communicatively coupled to a service provider 125 through a communication link 115. Communication link 115 may include a physical medium directly linking residential gateway 110 to service provider 125. Communication link 115 may include several intermediate links connected by network devices. Communication link 115 may include a multitude of parallel physical routes. Communication link 115 is not limited to any particular physical medium. Communication link 115 may be, for example, a fiber connection, a copper, a cable connection or other wired network connection. Communication link 115 may be a wireless connection. Communication link 115 may be any one of a variety of low-speed or high-speed links.

Service provider 125 may include one or more VPN concentrators 120. A VPN concentrator 120 may be a hardware device designed to handle a large number of incoming VPN tunnels. More specifically, A VPN concentrator 120 may be a type of multiplexer configured to combine multiple channels onto a single transmission medium in such a way that all the individual channels can be active simultaneously. While FIG. 1 illustrates VPN concentrator 120 as a single element for the sake of illustrative simplicity, it should be appreciated that VPN concentrator 120 may actually be a multitude of distributed VPN concentrator devices.

CPE 105 may include a VPN client configured to create a VPN tunnel between the CPE 105 and VPN concentrator 120. In an exemplary embodiment, the creation of the VPN tunnel may use the IPSec security protocol to tunnel between the two endpoints. VPN concentrator 120 may dynamically assign CPE 105 with an IP address (referred to as Tunnel Inner Address (TIA)).

Network 130 may be a wireless network, a wired network or any combination of wireless network and wired network. For example, network 102 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, network 130 may include, without limitation, telephone line, fiber optics, IEEE Ethernet 802.3, a wide area network ("WAN"), a local area network ("LAN"), or a global network such as the Internet. Also, network 130 may support, an Internet network, a wireless communication network, a cellular network, or the like, or any combination thereof. Network 130 may further include one, or any number of the exemplary types of networks mentioned above operating as a stand-alone network or in cooperation with each other. Network 130 may utilize one or more protocols of one or more network elements to which it is communicatively coupled. Network 130 may translate to or from other protocols to one or more protocols of network devices. Although network 130 is depicted as one network, it should be appreciated that according to one or more embodiments, network 130 may comprise a plurality of interconnected networks, such as, for example, a service provider network, the Internet, a broadcaster's network, a cable television network, corporate networks, and home networks.

Management server 135 may exist at a business premise 145, the depiction of which is purely exemplary and non-limiting. Management server 135 may be configured to communicate with CPE 105 to remotely cause CPE 105 to execute a performance test. Management server 135 may retrieve the calculated performance metrics from CPE 105 and may display the metrics via an interface and/or store the metrics in memory.

Figure 2:
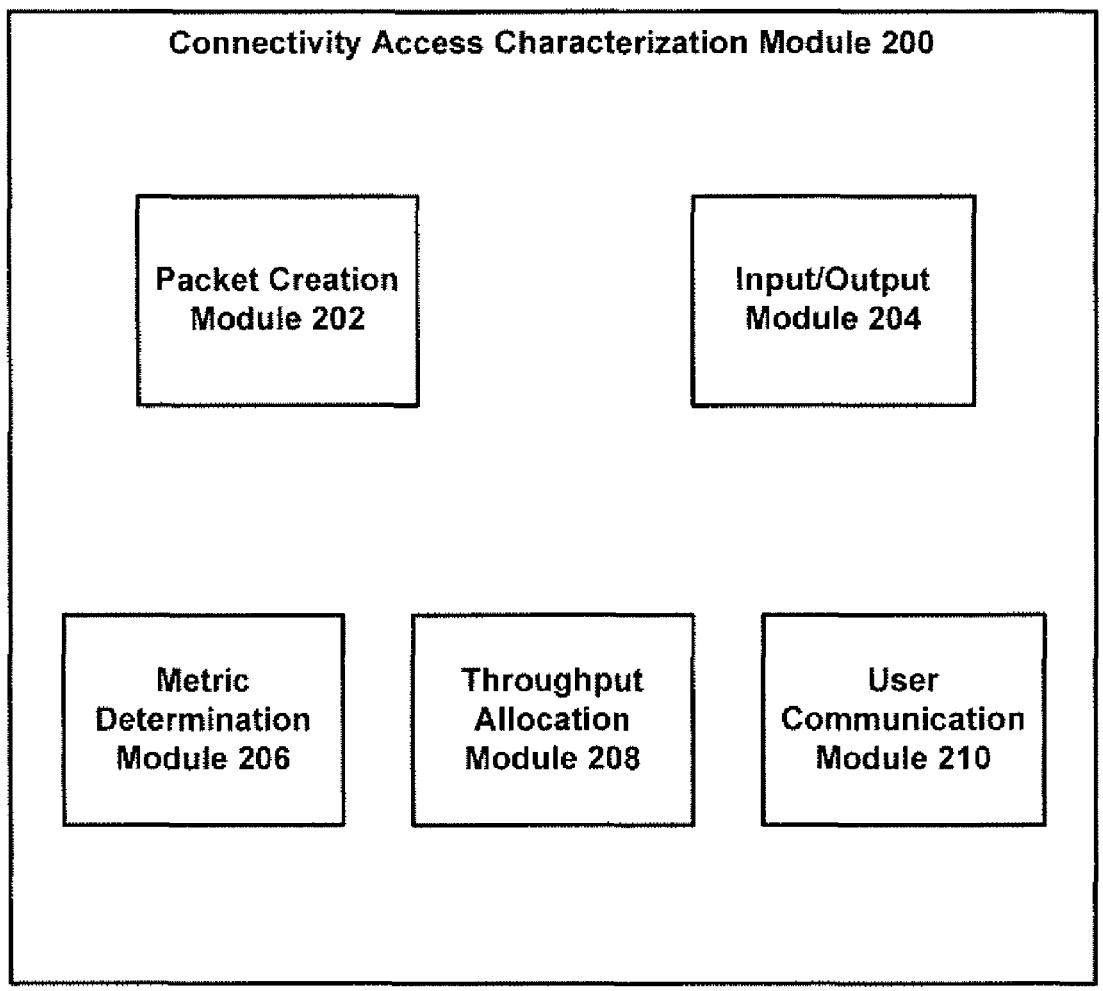
FIG. 2 is a block diagram of a connectivity access characterization module according to exemplary embodiments.

FIG. 2 is a block diagram of a connectivity access characterization module according to exemplary embodiments. The connectivity access characterization module 200 may be composed of a packet creation module 202, an input/output module 204, a metric determination module 206, throughput allocation module 208, and a user communication module 210.

The packet creation module 202 may reside in the CPE 105 illustrated in FIG. 1. The packet creation module 202 may create a stream of test data packets to be used in a UDP speed test with a VPN concentrator 120. The packet creation module 202 may be configured to create a VPN tunnel—using, for example, IPSec encryption—from CPE 105 to VPN concentrator 120.

The packet creation module 202 may address the data packet such that the packets are sent to the VPN concentrator, and then sent directly back to CPE 105, creating a loopback route. To this end, packet creation module 202 may use the IP address of CPE 105—which may be dynamically assigned by VPN concentrator 120—as the TIA for the destination IP address of the packet. The packet may then be encrypted and the outer packet destination IP address may be the IP address of VPN concentrator 120. The packet creation module 202 may include computer readable memory, a processor, and instructions stored in memory or embedded in logic circuitry to implement the steps creating the data packets for the loopback route.

The input/output module 204 may reside on CPE 105, an illustration of which is provided in FIG. 1. The input/output module may send the data packets created by packet creation module 202. Once sent, the packets may go through to the outer IP address, which may be VPN concentrator 120. VPN concentrator 120 may remove the outer packet, and identify the inner packet destination address of the sending device. VPN concentrator 120 may then send the packet to this inner packet destination address, which may then route the packet directly back to the sending device, which may be CPE 105.

The input/output module 204 may function in conjunction with the test packet creation module 202 in that the test packets created and addressed by the test packet creation module are then sent to the TIA by the input/output module 204. The input/output module 204 may also record in memory the time that the packets are sent to the TIA.

The input/output module 204 may also receive the data packets when they return from the loopback route. The input/output module 204 may record in memory the time that these packets are received. The input/output module may also records in memory any packets which were sent but failed to return.

The metric determination module 206 may work in conjunction with the input/output module 204 by using the time stamps on the sent and received packets to calculate certain throughput connectivity metrics. By comparing the time stamps on the sent and received data, the round trip time of each packet may be determined. Also by comparing the number of packets sent against the number of packets received, the number of dropped packets may be determined. Using this information, the metric determination module 206, which may reside on the CPE 105 shown in FIG. 1, may calculate such metrics as uplink throughput, downlink throughput, packet loss, delay, and jitter.

The metric determination module may use the exponential smoothed value of these test results as the estimated overall throughput available for use on the uplink side. In exemplary embodiments up to 80% of it may be used for voice traffic (e.g. Femtocell or VoIP traffic). The other 20% may be available for traffic for the customer's home network. These allocations may be adjusted depending on user or provider priorities or upon various network characteristics. The metric determination module 206 may prioritize the end-customer's voice traffic (including VoIP flows) over data traffic flows in the available throughput available for CPE use. A form of exponential smoothing is given by the formulas: $S_0 = x_0$; $S_t = \alpha x_t + (1-\alpha)s_{t-1} = s_{t-1} + \alpha(x_t - s_{t-1})$, where $\alpha$ is the smoothing factor, and $0 < \alpha < 1$.

In other words, the smoothed statistic $s_t$ may be a simple weighted average of the latest observation $x_t$ and the previous smoothed statistic $s_{t-1}$. Exponential smoothing may be applied, and it produces a smoothed statistic as soon as two observations are available. Values of $\alpha$ close to one have less of a smoothing effect and give greater weight to recent changes in the data, while values of $\alpha$ closer to zero have a greater smoothing effect and are less responsive to recent changes. The default value for $\alpha$ may be set at 0.8. The default value for $\alpha$ may be a value different than 0.8 depending on the desired smoothing effect. In either event, the default value may be adjusted to a value greater than 0 and less than 1. For example, if a greater smoothing effect is desired, the default value may be adjusted to a lesser value such as, by way of non-limiting example, 0.5. In some embodiments, a statistical technique may be used to optimize the value of $\alpha$. The value of $\alpha$ may be configurable via the management server.

In exemplary embodiments, throughput allocation module 208 may work in conjunction with the metric determination module 206 by taking the determined metrics and then allocating or prioritizing throughput based on the results. For example, voice calls may be at a first priority and throughput may first be allocated for that purpose. Throughput allocation module 208 may also work in conjunction with data packet creation module 202, input/output module 204, and metric determination module 206 to run the loopback tests using different VPN concentrators 120 in the loopback route. The performance metrics for various VPN concentrators 120 may be compared against each other. Preferred VPN concentrators may be selected based on the metric comparison. Throughput allocation module 208 may then allocate and prioritize throughput using metrics from the VPN concentrator 120 which provides the most throughput.

User communication module 210 allows the determined metrics to be displayed or reports to be generated. The user communication module may also allow the user to execute a loopback test on demand. The user communication module may reside on a management server and/or locally on CPE 105.

Figure 3:
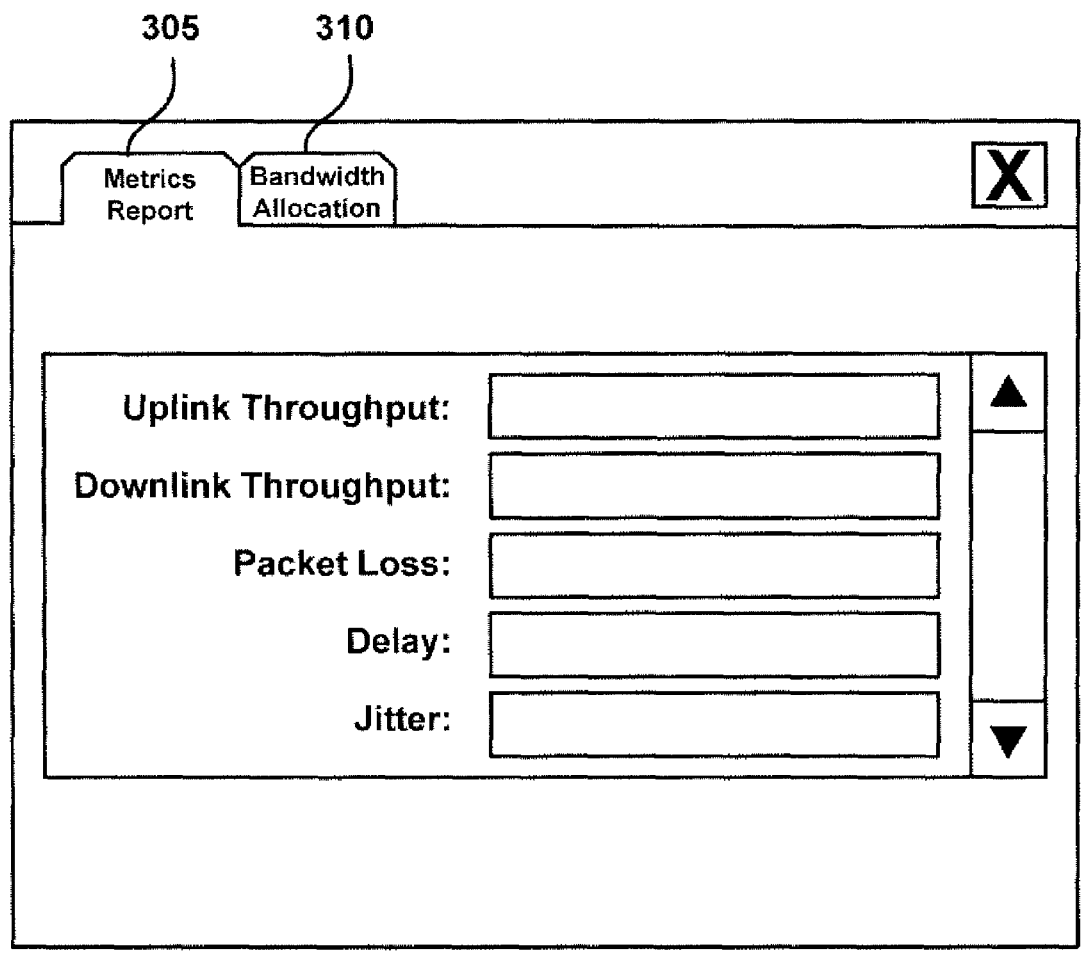
FIG. 3 illustrates the appearance of a user interface in accordance with exemplary embodiments.

FIG. 3 illustrates the appearance of a user interface in accordance with exemplary embodiments. Interface 300 shows one of two tabs that may be displayed by a user communication module (e.g. user communication module 210 of FIG. 2). Metrics report tab 305 may display network metrics that may be calculated based on the information learned through the loopback mechanism.

Bandwidth allocation tab 310 may provide the user a way to allocate or prioritize throughput resources based on the metrics displayed on metrics report tab 305. Interface 300 could also include an additional tab that allowed the user to instruct the system to execute a loopback test.

Figure 4:
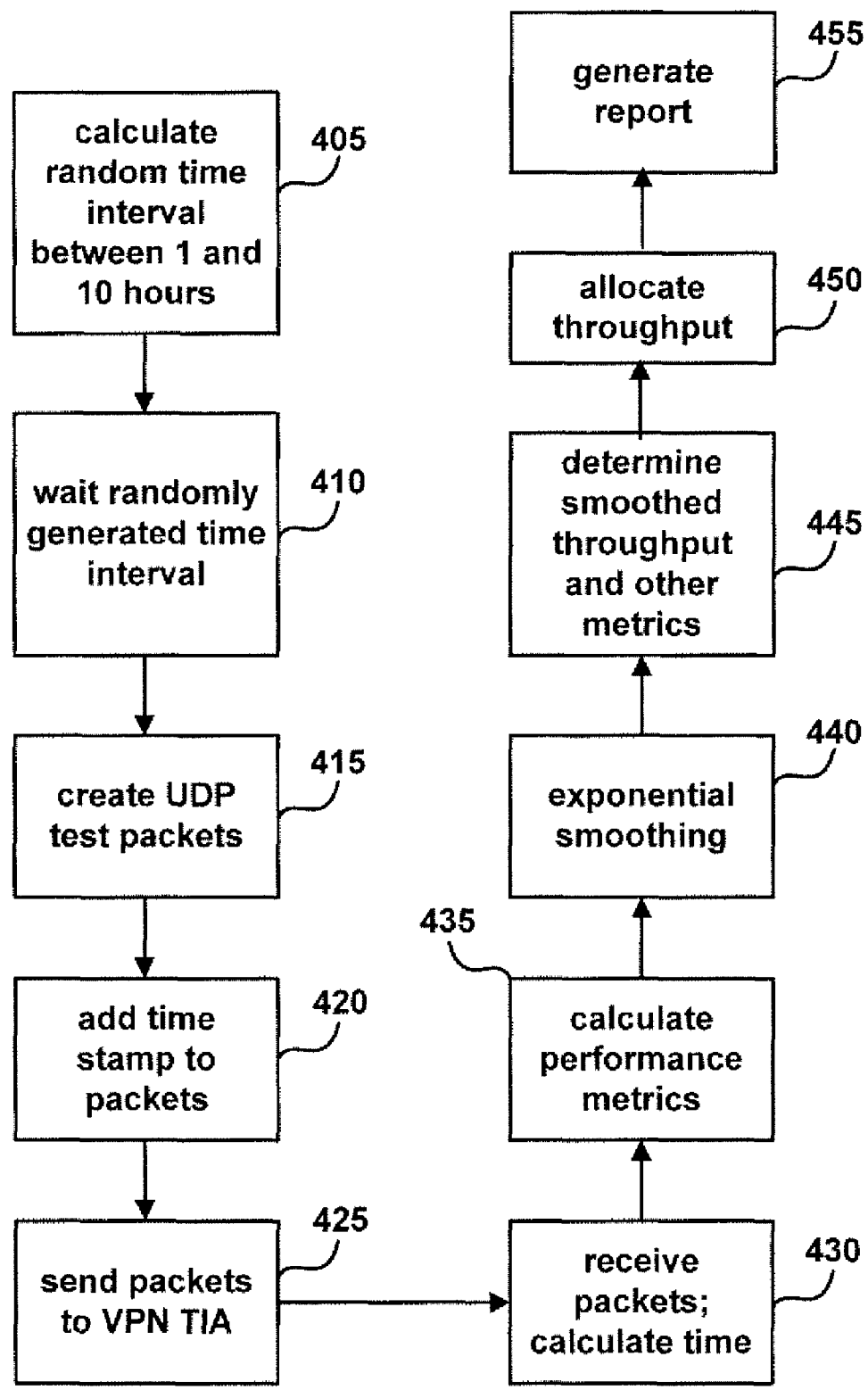
FIG. 4 is a flowchart illustrating a method for using a loopback mechanism to test performance characteristics of a network in accordance with exemplary embodiments.

FIG. 4 is a flowchart illustrating a method for using a loopback mechanism to test performance characteristics of a network in accordance with exemplary embodiments.

In an exemplary embodiment, the loopback test for network throughput may be performed at random intervals from 1 to 10 hours. This is illustrated at elements 405 and 410.

In exemplary embodiments, as illustrated at element 415, a packet creation module (e.g. packet creation module 202 of FIG. 2) may create data packets that make up a test stream. The data packets may then be time-stamped and sent to the VPN TIA, as is shown in elements 420 and 425.

By addressing the packets to the VPN TIA, a loopback mechanism ensues with the packets returning to the sending address. An input/output module (e.g. input/output module 204 of FIG. 2) may receive the data packets and may time-stamp their return.

A metric determination module (e.g. metric determination module 206 of FIG. 2) may calculate the round trip time for each of the received packets and may perform exponential smoothing on the round trip data for the received packets. Exponential smoothing, which is described in greater detail in the discussion of FIG. 2, may be applied when two observations of round trip times have been made. This is illustrated at element 440 and 445, which shows that the exponential smoothing operation takes as input a round trip time for a current packet and a previous packet. This exponential smoothing operation may be used as an estimate for network throughput. The round trip data information may also be analyzed to determine network jitter. Network jitter refers to the variation in the time between packets arriving, and may be caused by network congestion, timing drift, or route changes.

A metric determination module (e.g. metric determination module 206 of FIG. 2) may also calculate the number of packets that did not return, and can thus calculate the percentage of packets lost. Based on the determination of throughput, as determined from the exponential smoothing operation, this information can be used to selectively enable higher bandwidth applications. This is illustrated at element 450.

For example, the network may allocate up to 80% of its throughput for voice traffic (e.g. Femtocell or VoIP traffic). The other 20% may be available for traffic for the customer's home network). The metric determination module 206 may prioritize the end-customer's voice traffic (includes VoIP flows) over data traffic flows in the throughput which is available for CPE use.

As is shown in element 455, a report showing these calculated metrics may be generated by a user communication module (e.g. user communication module 210 of FIG. 2) Also, the information may be saved on the management server so that it may be queried for later retrieval.

The description above describes user devices, an analysis system, a communication network having network elements that are coupled to each other via one or more links (e.g., physical or logical), various networks of within a domain of the communication network, and other elements for coupling customers to the communication network, some of which are explicitly depicted, others of which are not. As used herein, the term "module" may be understood to refer to executable software, firmware, hardware, or various combinations thereof. It is noted that the modules are exemplary. The modules may be combined, integrated, separated, or duplicated to support various applications. Also, a function described herein as being performed at a particular module may be performed at one or more other modules and by one or more other devices instead of or in addition to the function performed at the particular module. Further, the modules may be implemented across multiple devices or other components local or remote to one another. Additionally, the modules may be moved from one device and added to another device, or may be included in both devices.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, etc.) separately. The functions described as being performed at various components may be performed at other components, and the various components may be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

I claim:

1. A method, comprising:
   creating test packets;
   adding time stamps to the test packets;
   sending the test packets from a consumer device to a virtual private network tunnel inner address, wherein the packets are addressed to return to the consumer device after traversing a virtual private network (VPN);
   receiving the test packets at the consumer device, wherein the test packets are time-stamped upon arrival;
   determining the time elapsed between the sending and receipt of each received test packet;
   calculating network performance metrics based on the determined elapsed times; and
   prioritizing use of the network in accordance with the calculated network performance metrics;
   wherein the method is configured to probe the liveliness of a VPN concentrator when no traffic is destined to the VPN concentrator.

2. The method according to claim 1, wherein one of the calculated performance metrics is an estimated throughput.

3. The method according to claim 2, further comprising calculating estimated performance metrics are calculated by performing a weighted average of the current and prior performance measurements.

4. The method according to claim 3, wherein the weighted average is performed by performing an exponential smoothing operation on the current and prior performance measurements.

5. The method according to claim 1, wherein the consumer device is configured to facilitate voice traffic.

6. The method according to claim 5, wherein the consumer device is a Voice over Internet Protocol Analog Telephone Adapter.

7. The method according to claim 5, wherein the consumer device is a FemtoCell.

8. The method according to claim 1, wherein voice traffic is given higher priority than all other traffic on the network.

9. The method according to claim 1, comprising:
   calculating network performance characteristic for a plurality of VPN concentrators;
   comparing the calculated the network performance characteristics for the plurality of VPN concentrators; and
   selecting a VPN concentrator on the basis of the comparison.

10. A computer readable non-transitory media containing computer executable code comprising code to perform the acts of the method of claim 1.

11. A system, comprising:
    A consumer device communicatively coupled to a service provider network, wherein the consumer device includes a processor and a memory storing computer readable instructions, and is configured to:
    create test packets;
    add time stamps to the test packets;
    send the test packets from a consumer device to a virtual private network tunnel inner address, wherein the packets are addressed to return to the consumer device;
    receive the test packets at the consumer device, wherein the test packets are time-stamped upon arrival;
    determine the time elapsed between the sending and receipt of each received test packet;
    calculate network performance metrics based on the determined elapsed times;
    prioritize use of the network in accordance with the calculated network performance metrics;
    calculate network performance characteristic for a plurality of virtual private network (VPN) concentrators;
    compare network performance characteristic for the plurality of VPN concentrators; and
    select a VPN concentrator on the basis of the comparison.

12. The system according to claim 11, wherein one of the calculated performance metrics is an estimated throughput.

13. The system according to claim 12, further comprising calculating estimated performance metrics are calculated by performing a weighted average of the current and prior performance measurements.

14. The system according to claim 13, wherein the weighted average is performed by performing an exponential smoothing operation on the current and prior performance measurements.

15. The system according to claim 11, wherein the consumer device is a device that enables voice traffic.

16. The system according to claim 15, wherein the consumer device is a Voice over Internet Protocol Analog Telephone Adapter.

17. The system according to claim 15, wherein the consumer device is a FemtoCell.

18. The system according to claim 11, wherein voice traffic is given higher priority than all other traffic on the network.

19. The system according to claim 11, wherein the system is performed to probe the liveliness of a VPN concentrator when no traffic is destined to the VPN concentrator.

20. A consumer device communicatively coupled to a service provider network, wherein the consumer device includes a processor and a memory storing computer readable instructions and is configured to:
    create test packets;
    send the test packets from a consumer device to a virtual private network tunnel inner address, wherein the packets are addressed to return to the consumer device after traversing a virtual private network (VPN);

receive the test packets at the consumer device, wherein the test packets are time-stamped upon arrival;

determine the time elapsed between the sending and receipt of each received test packet;

calculate network performance metrics based on the determined elapsed times; and prioritize use of the network in accordance with calculated performance metrics;

calculate network performance characteristic for a plurality of VPN concentrators;

compare the calculated network performance characteristic for the plurality of VPN concentrators; and select a VPN concentrator on the basis of the comparison, wherein the device is configured to probe the liveliness of a VPN concentrator when no traffic is destined to the VPN concentrator.

* * * * *